Oct. 1, 1935.　　　N. A. PALMGREN　　　2,016,021
UNIVERSAL PLAIN BEARING
Filed Oct. 20, 1934
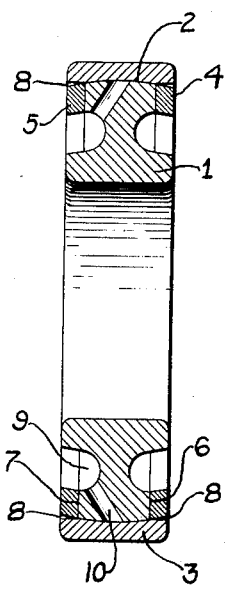
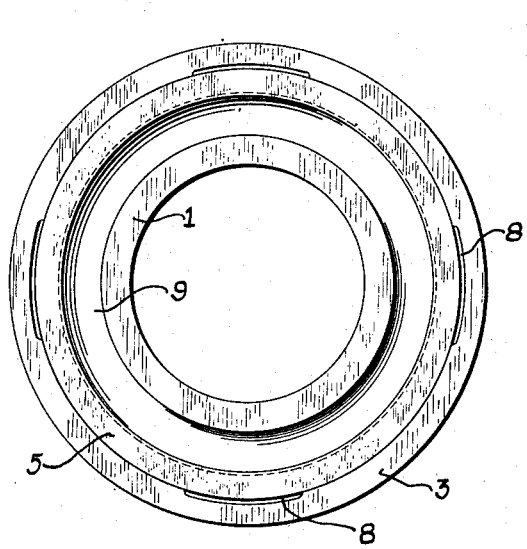
INVENTOR
Nils Arvid Palmgren
BY
his ATTORNEY Patented Oct. 1, 1935

2,016,021

UNITED STATES PATENT OFFICE 2,016,021

UNIVERSAL PLAIN BEARING

Nils Arvid Palmgren, Gottenborg, Sweden, assignor to Aktiebolaget Svenska Kullagerfabriken, Gottenborg, Sweden, a corporation of Sweden Application October 20, 1934, Serial No. 749,162
In Sweden January 23, 1934

3 Claims. (Cl. 308—72)

The function of a plain bearing depends substantially thereon that the sliding surfaces contact evenly with each other but with wedge shaped spaces slightly converging in the direction of rotation to provide for a carrying oil film. For taking radial loads the bearing may be given a small axial length with a view to reduce the concentration of load at the edges of the bearing, resulting from oblique positions and deflections. The only rational remedy is to provide spherical sliding surfaces so that concentration of load at the edges is prevented. Such a spherical plain bearing is, however, subject to the serious disadvantage that an axial displacement between the bearing surfaces renders a proper distribution of load impossible. A bearing designed to take radial as well as axial load in all directions, i. e. a universal bearing therefore must have special devices, partly for taking up radial and axial forces separately and partly to prevent an uneven distribution of load on the surfaces subject to radial as well as to those subjected to axial load.

The present invention relates to a universal bearing of the above mentioned kind. According to the invention the bearing comprises an inner bearing ring with an outer spherical sliding surface for taking up radial loads, an outer bearing ring with an inner spherical sliding surface to fit the spherical sliding surface of the inner ring, and thrust flanges supported by the spherical sliding surface of the outer ring, or more specifically by the extension of the spherical sliding surface of the outer ring, the thrust flanges having plane sliding surfaces engaging the inner ring for taking up thrust.

The invention is illustrated in the accompanying drawing.

Figure 1 shows a section of an axial plane of a bearing according to one embodiment of the invention.

Figure 2 is a side view of the same bearing.

The inner ring 1 is of I-section, the outer flange having the form of a spherical zone with its center on the geometrical axis of the ring. This spherical sliding surface 2 fits into a corresponding spherical surface of the outer ring 3 and serves the purpose of taking up radial loads. Through the spherical form of the sliding surfaces considerable tilting of one ring relative to the other may be accommodated, without causing concentration of forces at the edges.

Two thrust flanges 4 and 5 are supported and centered by the spherical surface of the outer ring. The flanges have plane surfaces 6 and 7 which fit against corresponding surfaces of the inner ring at the edges of the outer flange of the I-section. These flanges will then be axially fixed on the one side by the inner ring and on the other side by the outer ring through the tapered form of the spherical surface at the edges of the ring. The inner ring will thus be positively fixed in axial direction by the flanges. Only an inconsiderable relative movement between the inner ring 1 and the outer ring 3 can thus occur, and no concentration of forces at the edges of the spherical sliding surface can take place as a consequence of such axial movement.

The design also satisfies the condition that there should not be an unequal distribution of pressure on the thrust surfaces. The flanges can tilt to adjust themselves within ample limits to the position of the inner ring, since the flanges abut against a spherical surface on the outer ring. The adjustment of the flanges is counteracted only by the friction between the flanges and the outer ring. The comparatively insignificant eccentricity of the line of force of the axial load between flanges and inner ring consequent hereupon is, however, to advantage, as a forced variation in the thickness of the oil film is thus attained, through which the oil film is afforded sufficient pressure and load carrying capacity.

In order to further increase the possibilities of forming oil wedges on the original plane thrust surfaces, grooves 8 are provided at the edges of the spherical surface of the outer ring so that the flanges are supported at a plurality of spots. When under load, the flanges are subjected to local deflections so that wedge shaped spaces are formed for the oil film.

The bearing is lubricated by oil being introduced into the annular groove 9 of the inner ring, whence the oil is thrown through channels 10 by centrifugal force and flows to the sliding surface 2. The oil is then pressed toward the sides of the bearing by the load and is consequently also supplied to the sliding surfaces of the side flanges.

Having thus described my invention, I claim and desire to secure by Letters Patent:

1. A universal plain bearing comprising an inner bearing ring formed with an outer spherical sliding surface and with plane end faces, an outer bearing ring formed with an inner spherical sliding surface to fit the spherical sliding surface of the inner ring, and thrust flanges supported by the spherical surface of the outer ring, the said thrust flanges having plane sliding surfaces engaging the plane face of the inner ring.

2. A universal bearing according to claim 1, characterized thereby that the inner spherical surface of outer ring is interrupted at a number of places whereby the side flanges are supported by the outer bearing ring at a plurality of spots.

3. A universal plain bearing comprising an inner bearing ring of I-section formed with an outer spherical sliding surface and with plane end faces at the edges of the outer flanges of the I-section, an outer bearing ring formed with an inner spherical sliding surface to fit the spherical sliding surface of the inner ring, and thrust flanges supported by the spherical surface of the outer ring, the said thrust flanges having plane sliding surfaces engaging the plane faces of the inner ring.

NILS ARVID PALMGREN.